United States Patent
LaFleur et al.

[11] Patent Number: 6,087,442
[45] Date of Patent: Jul. 11, 2000

[54] POLYMERIC BLENDS

[75] Inventors: Edward Ewart LaFleur, Warminster; William James Work, Huntington Valley; Robert Mark Amici, Doylestown; Newman Mayer Bortnick, Oreland; Norman Lee Holy, Penns Park, all of Pa.

[73] Assignee: Rohm and Haas Company, Phila., Pa.

[21] Appl. No.: 08/083,957

[22] Filed: Jun. 25, 1993

Related U.S. Application Data

[63] Continuation-in-part of application No. 07/929,878, Aug. 12, 1992, abandoned.

[51] Int. Cl.$^7$ ....................................................... C08L 29/02
[52] U.S. Cl. ............................. 525/57; 525/221; 525/227
[58] Field of Search ............................. 525/57, 221, 227

[56] References Cited

U.S. PATENT DOCUMENTS

| | | |
|---|---|---|
| 3,425,979 | 2/1969 | Monaghan et al. . |
| 5,147,930 | 9/1992 | LaFleur et al. . |
| 5,189,097 | 2/1993 | LaFleur et al. . |
| 5,208,083 | 5/1993 | Freed ........................................ 525/57 |

FOREIGN PATENT DOCUMENTS

| | | |
|---|---|---|
| 258506 | 3/1988 | European Pat. Off. . |
| 3624577 | 2/1987 | Germany . |
| 3637446 | 5/1987 | Germany . |
| 6222553 | 3/1982 | Japan . |
| 62-01344 | 1/1987 | Japan . |

*Primary Examiner*—David W. Wu
*Assistant Examiner*—Ling-Siu Choi

[57] ABSTRACT

Polymer blends of at least one polar polymer are prepared by admixture with a poly(vinyl alcohol) and a (meth)acrylate copolymer also containing vinyl amide and/or unsaturated acid units. The ternary compositions have attractive processing and performance properties.

2 Claims, No Drawings

POLYMERIC BLENDS

FIELD OF THE INVENTION

This application is a continuation-in-part of U.S. application Ser. No. 07/929,878, now abandoned filed Aug. 12, 1992.

This invention relates to melt-processable thermoplastic combinations of polymers containing a high percentage of vinyl alcohol units blended with certain copolymers of alkyl methacrylates and/or acrylates with unsaturated organic acids, such as methacrylic acid, and/or vinyl amide structures, such as N-vinyl pyrrolidone group, which composites are then blended (or the three polymers simultaneously blended) with one or more polar polymers, such as polyesters, such as poly(ethylene terephthalate), poly(vinyl chloride), polyurethanes, such as thermoplastic polyurethanes, polyamides, polycarbonates, ethylene-vinyl alcohol co- and terpolymers, polyglutarimides, polymers and copolymers of methyl methacrylate, naturally occurring polymers such as starch, chitin, chitosan, lignin or cellulose and the like. Such blends may be processed by conventional plastics technology to form sheet, extruded or blown film, molded articles, and the like, which exhibit a useful balance of barrier and strength properties, such as good resistance to permeation of gases, low moisture absorptivity, and toughness/ modulus balance adequate for packaging uses.

BACKGROUND OF THE INVENTION

Of all the synthetic polymers considered as materials with useful gas permeation properties, such as resistance to passage of oxygen, carbon dioxide, water, and the like, poly(vinyl alcohol) (PVOH), which is a polymer made up of units of the structure

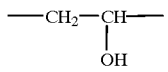

and generally prepared by the total or almost total hydrolysis of homopolymers of vinyl acetate or related vinyl esters, the starting polymer made up of units of the structure

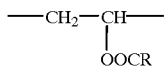

where R is alkyl, that is, from one to eight carbon atoms, preferably methyl, ranks as the most impervious to the passage of small molecules. PVOH derives this property from the high cohesive energy density and polarity of the hydroxyl groups. The presence of the network of hydroxyl groups has the concomitant effect of rendering the polymer (PVOH) impermeable to gases, but sensitive to moisture. The strong intermolecular interaction resulting from the high polarity of the —OH functional group gives rise to a melting temperature in the vicinity of the degradation temperature of PVOH. Consequently, melting is accompanied by degradation. The degradation is so severe that PVOH by itself cannot either be melt extruded or injection molded. Co-polymers having a low mol percentage of ethylene, such as from about 5 to about 25 mol percent, are similar to poly(vinyl alcohol) in that they cannot be melt-processed into film without the aid of plasticizers.

In U.S. patent application Ser. No. 07/781,715, filed Oct. 22, 1991, now U.S. Pat. No. 5,189,097 now also European Patent Application 91-311265, filed Dec. 4, 1991, which has some of the same inventors as the present application, are disclosed additive polymers useful in allowing melt processing of the poly(vinyl alcohol) materials discussed above without significant alteration of their physical and barrier properties. These additive polymers are copolymers of lower alkyl methacrylates or acrylates with a variety of nitrogenous monomers, especially those bearing amide groups, and most especially N-vinylpyrrolidone. Further is disclosed as more useful additives terpolymers containing lower alkyl methacrylates or acrylates, the same nitrogenous co-monomers, and copolymerized unsaturated carboxylic acids, such as methacrylic acid. It is further disclosed that these latter terpolymers form segmented copolymers on combining with the poly(vinyl alcohol) matrix polymers under certain processing conditions.

In a patent application in the U.S., Ser. No. 872,478, filed on Apr. 23, 1992, now abandoned also with some of the same inventors as the present application, is disclosed that copolymers of lower alkyl methacrylates and/or acrylates with unsaturated carboxylic acids, such as copolymers of methyl methacrylate with methacrylic acid, are also useful for the same purposes. It is further disclosed that the composites so formed may be segmented copolymers under certain processing conditions.

What has been discovered in the present invention is that certain of these composites of poly(vinyl alcohol), or copolymers which contain at least 50 mol % of

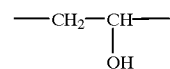

units, with lower alkyl methacrylate or acrylate copolymers with at least one of copolymerized acid or amide, especially cyclic amide, functionality, when melt-blended with structural polar polymers, produce blends of excellent physical, optical and barrier properties.

In the applications noted above, it had been found that a polymeric composite comprising from about 40 to about 95 parts, of a first polymer containing at least 50 mol % of units, preferably at least 90 mol %, of the structure

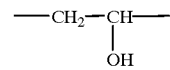

and optionally units of the structure

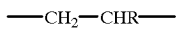

where R is H or CH$_3$, and from 5 to about 60 parts by weight of a second polymer containing at least about 70 parts of units derived from at least one lower alkyl methacrylate or acrylate, (lower alkyl meaning from 1 to 4 carbon atoms such as methyl, ethyl, propyl, or butyl), preferably methyl methacrylate, and at least one of either up to about 25 parts of units derived from a vinyl or vinylidene monomer containing an amide group, preferably a cyclic anide group of units of the structure

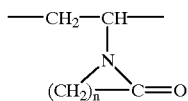

where n is 2, 3, 4, or 5, preferably units derived from N-vinyl pyrrolidone, or up to about 25 parts of units derived from an unsaturated carboxylic acid or anhydride, preferably methacrylic acid, may be melt-processed, such as by extrusion, into useful objects such as sheet, film, and fiber. It had further been found that combination of the two polymers noted above by melt-mixing will form a segmented melt-processable polymer wherein the two polymers are chemically combined to form a graft copolymer. Lower levels, down to 2 parts, of the additive in the composite may be used when the additive polymer is free from amide functionality or when the composite contains poly(vinyl alcohol) which has been washed or has been neutralized with acid such as phosphoric acid to remove residual sodium acetate, as taught in U.S. Pat. No. 3,425,979.

It is now been found that these composites may be blended, preferably in the melt, with polar polymers, to give a melt-processable blend which may be processed into useful sheet, film, or molded objects. In the sense that processing of the polar polymer is improved, these composites may be considered "processing aids". Polar polymers may be described as polymers which contain functionality other than carbon and hydrogen, and include poly(vinyl halides), such as poly(vinyl chloride) (PVC), poly (vinyl esters), such as poly(vinyl acetate), poly(meth)acrylic esters, polyglutarimides, polymers containing (meth)acrylonitrile, such as styrene/acrylonitrile copolymers or acrylonitrile/butadiene/styrene copolymers (ABS), polyesters, such as poly(alkylene terephthalates), polyamides, ethylene-vinyl alcohol co- and terpolymers, of less than 50 mol % vinyl alcohol units, ethylene-carbon monoxide copolymers, polycarbonates, poly(alkylene oxides), such as poly(propylene oxide) or poly(ethylene oxide), phenoxy resins, such as those formed by the reaction of epichlorohydrin and a bisphenol, and the like. The invention further applies to polar polymers which are of natural origin or modified from polymers of natural origin, such as starch, lignin, chitin, chitosan, cellulose, or chemically modified cellulose, such as esters such as cellulose acetate, cellulose acetate-propionate, cellulose acetate-butyrate, or ethers such as methyl cellulose. Many of these polymers are extremely difficult to process, and may be described as melt-intractable. The ratio of polar polymers to the composites may be from about 10:95 to about 5:90, preferably for thermoplastic polar polymers from about 60:95 to about 5:40, and more preferably from about 80:95 to about 5:20. Particularly useful polar polymers are aliphatic polyamides formed from lactams, such as polycaprolactam, polyundecanolactam, and polydodecanolactam, the polycarbonate formed from bisphenol A, poly(ethylene terephthalate), and elastomeric polyurethanes, such as those with polyether or polyester-polyol segments.

DETAILED DESCRIPTION OF THE INVENTION

Our invention is thus a polymeric blend comprising:
(a) from about 80 to about 95 parts of at least one polar polymer selected from the group consisting of poly (vinyl chloride), a polycarbonate, a polyglutarimide, a polymer of methyl methacrylate, a polyamide, a polyester, or a polymer containing units derived from styrene and acrylonitrile;
(b) from about 5 to about 20 parts of a polymeric composite of:
   i) from about 60 to about 95 parts by weight of a first polymer containing at least 50 mol % of units of the structure

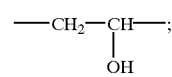

ii) from about 5 to about 40 parts by weight of a second polymer containing at least about 70 parts of units derived from at least one of a lower alkyl (of from 1 to 4 carbon atoms such as methyl, ethyl, propyl, or butyl) methacrylate or acrylate, and at least one of either up to about 25 parts of units derived from a vinyl or vinylidene monomer containing an amide group or up to about 25 parts of units derived from an unsaturated carboxylic acid or anhydride.

The invention further comprises a polymeric blend comprising:
(a) from about 10 to about 95 parts of at least one polar polymer;
(b) from about 5 to about 90 parts of a polymeric composite of:
   i) from about 40 to about 95 parts by weight of a first polymer containing at least 50 mol % of units of the structure

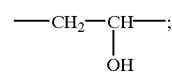

ii) from about 5 to about 60 parts by weight of a second polymer containing at least 70 parts of units derived from a lower alkyl (of from 1 to 4 carbon atoms such as methyl, ethyl, propyl, or butyl) methacrylate acrylate, and at least one of either up to about 25 parts of units derived from a vinyl or vinylidene monomer containing an amide group or up to about 25 parts of units derived from an unsaturated carboxylic acid or anhydride, wherein the polar polymer is a natural and melt-intractable polymer, such as starch, chitin, chitosan, lignin or cellulose. Again, the components (a), (b)(i), and (b)(ii) may be combined essentially simultaneously.

The invention further comprises a polymeric blend comprising:
(a) from about 25 to about 95 parts of at least one polar polymer;
(b) from about 5 to about 75 parts of a polymeric composite of:
   i) from about 40 to about 95 parts by weight of a first polymer containing at least 50 mol % of units of the structure

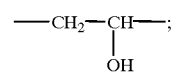

ii) from about 5 to about 60 parts by weight of a second polymer containing at least about 70 parts of units derived from at least one of a lower alkyl (of from 1 to 4 carbon atoms such as methyl, ethyl, propyl, or butyl) methacrylate or acrylate, and at least one of either up to about 25 parts of units derived from a vinyl or vinylidene monomer containing an amide group or up to about 25 parts of units derived from an unsaturated carboxylic acid or anhydride, wherein the polar polymer is a polyurethane, such as an elastomeric polyurethane, a phenoxy resin, an ethylene/carbon monoxide copolymer, a modified cellulosic, such as a cellulose ester, or a poly (alkylene oxide).

The invention further comprises all such above-described blends wherein the polymeric composite comprises:

(a) from about 60 to about 95 parts by weight of a first polymer containing at least 50 mole % of units of the structure;

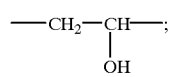

ii) from about 5 to about 40 parts by weight of a second polymer containing at least about 75 parts of units derived from methyl methacrylate, and at least one of either up to about 25 parts of units derived from N-vinyl pyrrolidone or up to about 25 parts of units derived from methacrylic acid.

Such blends may be in the form of an extruded film, extruded sheet, extruded fiber, or injection-molded article. Such blends may be prepared by methods wherein components (a), (b)(i), and (b)(ii) are combined essentially simultaneously In the claims and description, the parts of polar polymer and of composite total 100 parts, and other materials may be present as long as the polar polymer and composite are within the specified ratios. Similarly, the parts by weight of the vinyl alcohol polymer and the acrylic co- or terpolymer in the composite total 100 parts, and other materials may be present as long as the vinyl alcohol and acrylic polymers are within the specified ratios.

The composite may contain a blend of high and low molecular weight vinyl alcohol polymers. The composite may further contain glycerol or other plasticizer in small amounts. The composite may further contain impact modifiers known to the art, such as multistage polymers based on a poly(acrylate) first stage or a polybutadiene first stage and a methacrylate or styrene second stage, which may be present as a shell or in separate domains within the core. Either stage may contain acid-functional groups.

The blends may be prepared by dry-blending the components and melt-processing in an extruder or thermal mixer to form pellets, which are then re-processed into the desired object, or the dry blend may be directly melt-processed into the final article. The blend may contain more than one polar polymer. The blend may further contain pigments, dyes, thermal stabilizers, antioxidants, lubricants, fillers, and the like. The blend may further be prepared by admixing the additive polymer in emulsion form, when an emulsion polymerization is a feasible way to prepare the additive polymer, with the poly(vinyl alcohol) in solid form, and then processing directly with water removal such as by extrusion in a vented extruder, or by drying the powder blend under vacuum, and then blending with the matrix polymer. The blend may further be prepared by admixing the additive polymer in emulsion form, when such is feasible to prepare the additive polymer, with the poly(vinyl alcohol) and the matrix polymer in solid form, and then processing directly with water removal such as by extrusion in a vented extruder, or by drying the powder blend under vacuum, to form the blend.

The blend may further be prepared by admixing the additive polymer in emulsion form, when an emulsion polymerization is a feasible way to prepare the additive polymer, with the poly(vinyl alcohol) in solid form, and then processing directly with water removal such as by extrusion in a vented extruder, or by drying the powder blend under vacuum, and then blending with the matrix polymer. The blend may further be prepared by admixing the additive polymer in emulsion form, when such is feasible to prepare the additive polymer, with the poly(vinyl alcohol) and the matrix polymer in solid form, and then processing directly with water removal such as by extrusion in a vented extruder, or by drying the powder blend under vacuum, to form the blend.

By use of the term "composite" in the specifications and claims, there is meant no restriction that the poly(vinyl alcohol) component and the acrylic copolymer additive component must be blended together prior to admixture with the polar polymer. Indeed, one particular aspect of the invention could be described equally well as a polymeric blend comprising:

(a) from about 25 to about 95 parts of at least one polar polymer;

b) from about 2 to about 71.25 parts of a first polymer containing at least 50 mol % of units of the structure

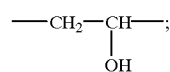

c) from about 0.25 to about 45 parts by weight of a second polymer containing at least about 70 parts of units derived from a lower alkyl methacrylate or acrylate, and at least one of either up to about 25 parts of units derived from a vinyl or vinylidene monomer containing an amide group or up to about 25 parts of units derived from an unsaturated carboxylic acid or anhydride.

Thus, the invention is meant to describe those blends where the three components are combined together all at one time, i.e.., essentially simultaneously, as well as when the second (additive) polymer and the first polymer containing poly(vinyl alcohol) are combined first and then blended with the matrix polymer.

The resulting objects may be especially useful in packaging, such as film, sheet, bottles, etc., where improved barrier properties are desirable, since the invention offers a way to combine poly(vinyl alcohol), with outstanding barrier properties, into polar polymers by an economically attractive means. Such uses may include bottles for beverages, film packaging for food, and the like. The blends may also be useful in a variety of molded or thermoformed objects, where a combination of improved modulus and good processing is required. Such objects include toys, electrical equipment housing, and the like.

Melt blends of polyamides with the polymeric composites described herein may be fabricated into film, film tubes, toys, gears, packing, shafts, curtain sliders, door rollers, household containers, and the like. Blends of the composites with a compatible, flexible elastomeric material may be used as compositions for contact with water and a rigid substrates, as for example in improved wiper blades.

The composite (or the two separate components of the composite) may be blended with polymers which are environmentally degradable, such as polylactates and other biologically derived polyesters, or polyamides or polyesters chemically modified with hydrolyzable, oxidizable, or photolytically unstable units or photosensitizing additives., such as benzophenone. Such polymers may include polycaprolactam modified by copolymerization with caprolactone, oxalate esters, or glycolides. Such polymers, especially when in monofilament, thin rod, or net form, will in the environment tend to develop a higher level of exposed surface upon leaching of the poly(vinyl alcohol) and thus degrade more rapidly to lower molecular weight, more brittle, less form-retaining polymers upon longer exposure to the environment, such as sun, rain, lake or sea water, compost piles, trash piles, garbage dumps, and the like.

Blends of the composite with a water-soluble or water-dispersible polyester may be useful as powdered sizing aids for textiles, which may be removed at the appropriate time by washing.

The composite in combination with polar polymers, with or without water-soluble electrolytes, may be processed into sheet from which, with appropriate extraction techniques, the electrolytes and/or the poly(vinyl alcohol) may be removed to leave a porous plastics sheet, useful, inter alia, in separations technology. Extracted fibers with a porous structure may also be prepared.

The composites may be blended with ethylene-vinyl alcohol copolymers and melt-processed as adhesive resin compositions or as tie layers with improved barrier properties for composite multi- layer bottles or packaging.

The blends, where the polar polymer may readily form fibers, may be processed by melt-extrusion techniques into fibers of high water absorption. The blends may also be extruded and fibrillated into fibers for uses, such as non-woven bonded materials, with high water absorption. Such fibers or other extrudates may be useful, especially those prepared with an environmentally degradable polyamide, as netting, monofilaments, components of diaper backings, ground covers, and the like.

In the following examples, which describe the physical and mechanical properties of numerous blends formed from combining the melt processable PVOH/Acrylic co- and terpolymer composites with polar polymers such as polycaprolactam, the following abbreviations are used: "Nylon" for polyamides in general, Nylon 6 for polycaprolactam, PVOH for the one or more specific polymers of the Example with greater than 50 mol % of units of vinyl alcohol, "Acrylic polymer" for the one or more particular copolymers of an alkyl methacrylate with a vinyl-lactam and/or a copolymerizable acid.

EXAMPLES 1–14

These examples describe blends of a poly(caprolactam) having a high amine-group end content with a composite of AIRVOL®-205 with a methyl methacrylate/N-vinylpyrrolidone copolymer. AIRVOL®-205 is a poly(vinyl acetate) hydrolyzed to 88–89% vinyl alcohol of $M_w$ 13–50,000.

Nylon 6(XPN) obtained from Allied Signal consisted of 64.93 and 1.07 meq. of amine and acid end groups respectively. The glass temperature Tg, of the Nylon 6(XPN)/PVOH-Acrylic blends, TABLE I, exhibited a monotonic increase with increasing amount of the PVOH-Acrylic composite. A similar but reverse trend may also be observed, TABLE I, for both the melt temperature, $T_m$, and heat of fusion, $DH_f$. These changes in the thermal properties of the blends are characteristic evidences of compatibility between the existing phases of the blends.

The blend mixture is fed into the hopper of a 1 inch (25.4 mm) single screw, 24 to 1 L:D, extruder in which the mixture was melt compounded and pelletized. The processing conditions were as follows:

| | |
|---|---|
| EXTRUDER BARREL TEMPERATURE: | ZONE-1 = 210° C. |
| | ZONE-2 = 210° C. |
| | ZONE-3 = 213° C. |
| EXTRUDER DIE TEMPERATURE: | DIE-1 = 216° C. |
| | DIE-2 = 216° C. |
| EXTRUDER SCREW SPEED: | = 80 RPM |

The pellets were dried and evaluated by DSC for thermodynamic stability and miscibility. As shown in TABLE I, the melt processable PVOH/Acrylic composites were found to be exceptionally miscible and compatible with the NYLON 6(XPN) polymer in amounts up to 70% by weight of P(MMA-NVP) acrylic copolymer. It should be noticed that all compositions of the blends containing the PVOH/Acrylic composite retained the high melting point of the NYLON 6, which makes them suitable for high temperature applications.

In EXAMPLE 13, a binary blend, consisting of NYLON 6(XPN) and a melt processable composition of AIRVOL®-205 and the acrylic copolymer P(MMA-NVP=75/25) in the weight ratio of 3:2, was melt compounded, extruded and pelletized at the previously described processing conditions to yield a thermally stable blend. The thermal properties of the blend were evaluated by DSC and are listed in TABLE I.

TABLE I

Thermal Properties of Homopolymers and Blends in the System: NYLON-6(XPN)/(AIRVOL ®-205:P(MMA-NVP = 75/25) = 4:1).

| No. | POLYMER/COMPOSITE | COMP.(w/w) | Tg(° C.) | Tm(° C.) | DHf(J/g) |
|---|---|---|---|---|---|
| 1. | NYLON-6(XPN) | 100 | 52.21 | 224.88 | 68.03 |
| 2. | AIRVOL ®-205:P(MMA-NVP = 75/25) = 4:1 | 100 | 68.7;114.33 | 182.62 | 24.01 |
| 3. | AIRVOL ®-205:P(MMA-NVP = 75/25) = 3:2 | 100 | | | |
| 4. | EX.1/EX.2 | 95/05 | 51.26 | 222.14 | 64.89 |
| 5. | EX.1/EX.2 | 90/10 | 53.24 | 222.11 | 60.83 |
| 6. | EX.1/EX.2 | 85/15 | 53.99 | 221.61 | 56.21 |
| 7. | EX.1/EX.2 | 80/20 | 55.02 | 221.12 | 46.25 |
| 8. | EX.1/EX.2 | 75/25 | 55.97 | 221.32 | 50.92 |
| 9. | EX.1/EX.2 | 70/30 | 60.16 | 221.37 | 45.05 |
| 10. | EX.1/EX.2 | 60/40 | 63.16 | 219.90 | 40.39 |

TABLE I-continued

Thermal Properties of Homopolymers and Blends in the System: NYLON-6(XPN)/(AIRVOL ®-205:P(MMA-NVP = 75/25) = 4:1).

| No. | POLYMER/COMPOSITE | COMP.(w/w) | Tg(° C.) | Tm(° C.) | DHf(J/g) |
|---|---|---|---|---|---|
| 11. | EX.1/EX.2 | 50/50 | 64.38 | 218.91 | 35.84 |
| 12. | EX.1/EX.2 | 40/60 | 69.16 | 215.17 | 18.97 |
| 13. | EX.1/EX.2 | 30/70 | 73.47 | 219.65 | 15.58 |
| 14. | EX.1/EX.3 | 50/50 | 60.00 | 215.53 | 33.61 |

EXAMPLES 15–17

Binary blends of poly(caprolactam), Nylon 6(CAPRON 8202) $M_w$ ca. 18,000, having an approximately equal amount of acid and amine end groups and a melt processable composite of AIRVOL®-205 and the acrylic copolymer P(MMA-NVP=75/25) were prepared by dry blending and melt compounding in a single screw extruder at the processing conditions described in EXAMPLE 1. The extrudates were pelletized and dried in a forced air oven prior to thermal analysis by DSC and injection molding on an ARBURG injection molding machine equipped with a heated ASTM family mold for the formation of test pieces. The molding conditions were: Nozzle: 228° C.; Zones 1, 2, and 3: 223–230° C.; injection pressure 3.1 mPa; back pressure 2.1 mPa; mold temperature 35° C. The thermal and mechanical properties are listed in TABLES II and III respectively. The incorporation of the PVOH-Acrylic composite into the Nylon 6 phase has little effect on the impact and tensile properties of the polycaprolactams.

TABLE II

Thermal Properties of Homopolymers and Blends in the System: Nylon 6(CAPRON 8202)/AIRVOL ®-205:P(MMA-NVP = 75/25) = 4:1.

| No. | POLYMER/COMPOSITE | COMP. (w/w) | Tg(° C.) | Tm(° C.) | DHf (J/g) |
|---|---|---|---|---|---|
| 15. | Nylon 6(CAPRON 8202) | 100 | 54.25 | 223.96 | 70.97 |
| 16. | EX.15/EX.2 | 90/10 | 52.60 | 221.99 | 70.04 |
| 17. | EX.15/EX.2 | 80/20 | 54.18 | 222.33 | 61.06 |

TABLE III

Physical Properties of Blends in the System: Nylon 6(CAPRON 8202)/AIRVOL ®-205:P(MMA-NVP = 75/25) = 4:1.

| | EXAMPLES | | |
|---|---|---|---|
| PHYSICAL PROPERTY | 15 | 16 | 17 |
| SPECIFIC GRAVITY | 1.136 | 1.148 | 1.158 |
| TENSILE-YIELD, gPa | 25.8 | 26.1 | 28.5 |
| ELONGATION @ BREAK % | >200 | >200 | >200 |
| TENSILE-MODULUS, mPa | 1.15 | 1.27 | 1.32 |
| TENSILE IMPACT STRENGTH (kJ/m2) | 1232.25 | 1072.81 | 628.66 |
| DYNATUP IMPACT STRENGTH (J) | 54.91 | 74.18 | 6.98 |
| NOTCHED IZOD @ 0° C. (J/m) | 0.71 | 0.56 | 0.62 |
| NOTCHED IZOD @ 23° C. (J/m) | 1.29 | 1.15 | 1.03 |
| UNNOTCHED IZOD @ 23° C. (J/m) (NO BREAK) | 47.48 | 46.79 | 47.70 |
| UNNOTCHED CHARPY (kJ/m2) (NO BREAK) | 70.80 | 70.92 | 70.21 |
| ROCKWELL HARDNESS (unannealed), L | 88.05 | 92.35 | 93.80 |
| ROCKWELL HARDNESS (ann. 4 hrs. @ 80° C.), L | 93.30 | | 95.80 |
| DTUFL (264 psi, 2° C./min.) | 51.15 | 52.00 | 50.30 |

TABLE III-continued

Physical Properties of Blends in the System: Nylon 6(CAPRON 8202)/AIRVOL ®-205:P(MMA-NVP = 75/25) = 4:1.

| | EXAMPLES | | |
|---|---|---|---|
| PHYSICAL PROPERTY | 15 | 16 | 17 |
| (unannealed) 0° C. DTUFL (264 psi, 2° C./min.) (ann. 4 hrs. @ 80° C.), ° C. CLASH-BERG TORSIONAL MODULUS, | 60.20 | | 53.55 |
| gPa @ 40° C. | 0.83 | 0.67 | 0.67 |
| gPa @ 80° C. | 0.34 | 0.28 | 0.23 |
| gPa @ 120° C. | 0.27 | 0.23 | 0.17 |

EXAMPLES 18–35

These examples demonstrate the blending of the melt-processable composites, here based on an acrylic terpolymer, with various polyamides.

In the following blend compositions, the acrylic composites studied were two:

a) PVOH-1 is a 4:1 composite of a poly(vinyl acetate) hydrolyzed to 87–89% "vinyl alcohol", MW described by the supplier as 13,000–50,000, and known as AIRVOL®-205 (Air Products Co., Allentown, Pa.) with the acrylic terpolymer prepared and isolated as in European Patent Application 91/3112652, of the composition P(MMA-NVP-MAA=70/25/05), where MMA is methyl methacrylate, NVP is N-vinyl pyrrolidone, and MAA is methacrylic acid;

b) PVOH-2 is a 4:1 composite of fully hydrolyzed PVOH (AIRVOL®-107), MW 13,000–50,000, degree of hydrolysis 98–98.8%, with an acrylic terpolymer P(MMA-NVP-MAA=70/25/05).

Samples of Nylon 6, (Example 15), Nylon 11 (polyundecanolactam), Nylon 12 (polydodecanolactam) and a special grade of transparent Nylon 12, probably containing other functionality to lessen crystallinity and make the polymer transparent, trade name Grilamid TR55FC, supplied by EMS-American Grilon Inc., Sumter, S.C., were dried in a forced air oven at 75° C. prior to blending and melt compounding in a Killion extruder with the previously prepared melt processable PVOH composite. For the purpose of comparison, samples of each of the Nylon resins were also similarly extruded and pelletized. The pellets derived from the composites and the neat resins were further processed by extrusion and injection molding into thin films (3–5 mils) and ASTM parts. The films were tested for oxygen permeability while the tensile and impact properties of the parts were evaluated by the ASTM methods.

As can be seen from the data presented in TABLES IV–VII the $O_2$ permeability of the Nylon/PVOH-Acrylic Terpolymer blends show a 30 to 50% improvement over that of the neat Nylons at 80% relative humidity. This improvement in $O_2$ permeability is significant particularly when it is considered that moisture has a deleterious effect on the gas barrier property of both Nylon and PVOH. Improvement may also be observed in the tensile properties of the various Nylon blends. However, all of the Nylon/PVOH-Acrylic Terpolymer blends exhibited a loss in impact properties. This trend in tensile and impact properties is observed for blends of Nylon with both PVOH-1 and PVOH-2. A possible explanation for the improvement in physical properties may be the intermolecular interaction between the —O—H of PVOH and the —N—H and —C=O moieties of the Nylon.

COMPARATIVE EXAMPLES 18–21

Samples of Nylon 6, Nylon 11, Nylon 12 and a special grade of transparent Nylon 12(Grilamid TR55FC) were dried in a forced air oven at 75° C. and then either extruded into thin (3–5 mils) films or injection molded on an Arburg injection molding machine. The thin films were extruded at the following processing conditions:

| | |
|---|---|
| EXTRUDER BARREL TEMPERATURE: | ZONE-1 = 191.0° C. |
| | ZONE-2 = 204.4° C. |
| | ZONE-3 = 204.4° C. |
| DIE TEMPERATURE: | DIE-1 = 199.0° C. |
| RATE | RPM = 55 |
| ROLL TEMPERATURE: | 38.0° C. |

The injection molding conditions for Nylon 6 and 11 were as follows: Nozzle: 234° C.; Zones 1, 2, and 3: 222, 230, and 222° C. respectively; injection pressure=3.1 mpA; back pressure=2.1 mPa; mold temperature=52° C. The molding conditions for Nylon 12 differ only in temperature from that of the above: Nozzle: 243° C.; Zones 1, 2 and 3: 240, 264 and 257° C. respectively. The gas permeability and mechanical properties are listed in TABLE IV.

TABLE IV

Physical Properties of Nylon-6, -11, -12 and Grilamid.

| | EXAMPLES | | | |
|---|---|---|---|---|
| PHYSICAL PROPERTY | NYLON 6 | NYLON-11 | NYLON-12 | GRILAMID |
| COMPARATIVE EXAMPLES: | 18 | 19 | 20 | 21 |
| TENSILE-YIELD, mPa | 31.7 | 10.5 | 27.3 | 68.5 |
| ELONGATION @ BREAK % | >260 | >260 | >256 | >180 |
| TENSILE-MODULUS, gPa | 1.3 | 0.26 | 0.93 | 1.87 |
| DYNATUP IMPACT STRENGTH (J) | 68.9 | 45.80 | 42.49 | 79.07 |
| NOTCHED IZOD @ 23° C. (J/m) | 139.37 | BUCKLE | 46.46 | 18.69 |
| DTUFL (264 psi, 2° C./min.) (unannealed) ° C. | 53.55 | 47.05 | 56.95 | 129.05 |
| DTUFL (264 psi, 2° C./min.) (ann. 4 hrs. @ 80° C.), ° C. | 58.50 | 54.20 | 58.20 | 132.45 |
| $O_2$ PERMEABILITY, 80% R.H (cc. mil/100 in². Atm. Day) | | 73.08 | 66.60 | 54.82 |

EXAMPLES 22–25

The PVOH described in EXAMPLE 4 was dry blended with the acrylic terpolymer, P(MMA-NVP-MAA=70/25/05), of molecular weight MW=77,000, extruded and pelletized to yield a melt processable PVOH composite. The PVOH composite was combined with NYLON 6, NYLON 11, NYLON 12 and GRILAMID TR55FC to yield blends of a 4:1 ratio of NYLON to melt processable PVOH. The mechanical properties of the blends were evaluated according to ASTM standards. A list of the properties are given in TABLE V.

TABLE V

Physical Properties of Blends of Nylon with Melt Processable PVOH(AIRVOL-205)/P(MMA-NVP-MAA = 70/25/05)

| EXAMPLES: | 22 | 23 | 24 | 25 |
|---|---|---|---|---|
| NYLON 6 %(w/w): | 80 | | | |
| NYLON 11 %(w/w): | | 80 | | |
| NYLON 12 %(w/w): | | | 80 | |
| GRILAMID %(w/w): | | | | 80 |
| PVOH-1 %(w/w): | 20 | 20 | 20 | 20 |
| PHYSICAL PROPERTY | | | | |
| TENSILE-YIELD, mPa | 56.79 | 26.77 | 40.58 | 75.99 |
| ELONGATION @ BREAK % | 319.90 | 232.60 | 233.10 | 181.40 |
| TENSILE-MODULUS, gPa | 1.84 | 0.56 | 1.37 | 1.99 |
| DYNATUP IMPACT STRENGTH (J) | 6.75 | 5.00 | 5.78 | 20.88 |
| NOTCHED IZOD @ 23° C. (J/m) | 58.21 | 34.71 | 22.96 | 13.35 |
| DTUFL (264 psi, 2° C./min.) (unannealed) ° C. | 53.65 | 49.40 | 57.15 | 124.25 |
| DTUFL (264 psi, 2° C./min.) (ann. 4 hrs. @ 80° C.), ° C. | 58.10 | 49.80 | 62.25 | 124.30 |

EXAMPLES 26–29

The melt processable PVOH composite used in the examples (PVOH-2) consisted of AIRVOL®-107 (Mw=13–50K, and degree of hydrolysis equal to 98.0–98.8 mol. %) and an acrylic terpolymer of MMA/NVP/MAA=70/25/05; the composite is described in Examples 18–35. The PVOH composite, was made by a process of melt compounding in a single screw extruder. The composite, in the form of pellets, was combined with all of the Nylons described in EXAMPLES 18–21, except Grilamid, melt compounded, extruded and pelletized at the following conditions:

| | |
|---|---|
| EXTRUDER BARREL TEMPERATURE: | ZONE-1 = 201° C. |
| | ZONE-2 = 213° C. |
| | ZONE-3 = 212° C. |
| EXTRUDER DIE TEMPERATURE: | DIE-1 = 206° C. |
| | DIE-2 = 206° C. |
| EXTRUDER SCREW SPEED: | = 100 RPM |

In the case of the PVOH/Grilamid blend, the extrusion process was carried out at higher barrel and die temperatures: ZONES-1, -2 and -3 were 221, 240 and 241° C. respectively; DIES-1, and -2 were 232 and 221° C. respectively. The extrudate was fed to a water bath and a pelletizer. The extruded pellets were dried in a forced air oven at 75° C. prior to injection molding on an ARBURG injection molding machine. The compositions are summarized in weight percent with their respective mechanical properties in TABLE VI. The impact values were tested according to ASTM D256-84 Izod Impact Test. The Tensile Yield Strength, Elongation at Break and Tensile Modulus were tested according to ASTM D638-84. The drop weight impact was measured according to the procedure of ASTM D2444 with the Dynatup impact apparatus. The deformation temperature under load (DTUFL) was measured at a load of 1.8 mPa in degrees centigrade using ASTM D 648-72 with 0.25 in. (6.35 mm) thick test specimens.

TABLE VI

Physical Properties of Blends of Nylon with Melt Processable PVOH(AIRVOL-107)/P(MMA-NVP-MAA = 70/25/05)

| EXAMPLES: | 26 | 27 | 28 | 29 |
|---|---|---|---|---|
| NYLON 6 %(w/w): | 80 | | | |
| NYLON 11 %(w/w): | | 80 | | |
| NYLON 12 %(w/w): | | | 80 | |
| GRILAMID %(w/w): | | | | 80 |
| PVOH-2 %(w/w): | 20 | 20 | 20 | 20 |
| PHYSICAL PROPERTY | | | | |
| TENSILE-YIELD, mPa | 45.52 | 10.45 | 29.78 | 69.43 |
| ELONGATION @ BREAK % | 221.67 | 175.00 | 205.00 | 164.00 |
| TENSILE-MODULUS, gPa | 1.95 | 0.44 | 1.23 | 2.37 |
| DYNATUP IMPACT STRENGTH (J) | 10.27 | 2.88 | 9.04 | 9.27 |
| NOTCHED IZOD @ 23° C. (J/m) | 42.17 | 57.14 | 26.17 | 21.36 |
| DTUFL (264 psi, 2° C./min.) (unannealed) ° C. | 61.00 | 49.65 | 102.45 | 127.45 |
| DTUFL (264 psi, 2° C./min.) (ann. 4 hrs. @ 80° C.), ° C. | 79.60 | 82.60 | 72.95 | 123.35 |

EXAMPLES 30–35

Samples of the blend compositions listed in TABLE VII were extruded into thin (3–5 mils) films and thick sheets (20–30 mils). For the film and sheet extrusion a 1 inch (25.4 mm), 24:1 L/D and 3:1 compression ratio Killion extruder was employed. The extruder was equipped with a 6 inch (0.154 meter) coat hanger type flat film die. The processing conditions were as follows: Extruder temperature Zone-1= 197° C.; Zones-2 and -3 were 207° C. The screw speed was 55 rpm. The film was extruded onto a chill roll maintained at 38° C. where it was drawn down to 3 mil in thickness and wound into a roll at a speed of 30 feet ( 9.14 meters) per second.

The film was tested for oxygen permeability on a MOCON Ox-Tran 1000 unit, manufactured by Modern Controls, of Minneapolis, Minn. The films were mounted in the diffusion cells where they were first purged with nitrogen as a first step in establishing a base line. This was followed by exposing the upper surface of the film to an oxygen rich atmosphere and the lower surface to the carrier gas (1% $H_2$ in $N_2$). The transmission of oxygen at steady state was monitored and detected by a nickel cadmium fuel cell known as a Coulox Detector. The Ox-Tran 1000 unit was equipped to record the steady state flux in units of cc. mil/100 in². Atm. Day. Measurements were made at 23° C., and 80% relative humidity. The ASTM test D-3985 for oxygen permeability was used. Results of the measurements are reported in TABLE VII.

TABLE VII

Physical Properties of Blends of Nylon with Melt Processable PVOH(AIRVOL ®-205)/P(MMA-NVP-MAA = 70/25/05)

| EXAMPLES: | 30 | 31 | 32 | 33 | 34 | 35 |
|---|---|---|---|---|---|---|
| NYLON 11 %(w/w): | 90 | 70 | | | | |
| NYLON 12 %(w/w): | | | 90 | 70 | | |
| GRILAMID %(w/w): | | | | | 90 | 70 |
| PVOH-1 %(w/w): | 10 | 30 | 10 | 30 | 10 | 30 |
| PHYSICAL PROPERTY | | | | | | |
| *O2 PERMEABILITY 80% R.H | 45.2 | 33.8 | 59.7 | 37.6 | 49.6 | 31.3 |

*(cc. mil/100 in². Atm. Day)

EXAMPLES 36–44

These examples demonstrate the modification of a polyurethane with the composites described earlier.

The data listed in TABLES VIII–X show evidence of some degree of compatibility between the polyurethane and the PVOH-Acrylic Terpolymer composite. Each of the polyurethane/PVOH-Acrylic Terpolymer blends show improvement in tensile and oxygen permeability properties over the respective base polyurethane resin. Both PVOH-1 and PVOH-2/polyurethane blends, TABLES IX and X, exhibited comparable physical properties. It is interesting to note that both Nylon and polyurethane are capable of hydrogen bonding interaction with the PVOH-Acrylic Terpolymer via the —O-H, —C═O and —N—H moieties. The apparent improvement in the tensile and high moisture gas permeability of the Nylon and polyurethane may have important implications in the fiber forming properties of these polymers.

The melt processable PVOH composites described in EXAMPLES 22 and 26 were each dry blended with three different thermoplastic polyurethane elastomers (PUE) in the weight ratio of 4:1 PUE to PVOH. The PUE used in the experiments are composed of the reaction product of a polyisocyanate (aliphatic or aromatic) with polyester, polyether or polycaprolactone polyols. Chain extenders such as diols and diamines may also be used in the preparation of the PUEs. The particular PUEs used were obtained from Dow Chemical Co. under the trade name Pellethane® (polyurethane from 4,4'-methylenediphenyl diisocyanate, 1,4-butanediol and polytetramethylene glycol) and B. F. Goodrich Co. under the trade name Estane® (polyurethane from polyester polyol base). The mixture was first combined in a polyethylene bag prior to being fed into a single screw extruder of L/D=24:1 and compression ratio of 3:1. The processing conditions were as follows: Extruder barrel temperature: Zones-1, -2 and -3 were 197, 207 and 207° C. respectively; Die temperatures were 199 and 201° C. The screw speed was 100 RPM. The extrudates were fed to a water bath and a pelletizer.

The pellets were dried prior to injection molding on an Arburg injection molding machine equipped with a heated ASTM family mold for the formation of test pieces. The molding conditions were as follows: Nozzle: 223° C.; Zones 1, 2, and 3: 236, 247 and 226° C. respectively; injection pressure 3.1 mPa; back pressure 2.1 mPa; mold temperature 49° C. Samples of the blends and the respective homopolymers were also extruded into thin (3–5 mils) films and thick sheets (20–30 mils). For the film and sheet extrusion a 1 inch (25.4 mm.), 24:1 L/D and 3:1 compression ratio Killion extruder was employed. The extruder was equipped with a 6 inch coat hanger type flat film die. The processing conditions were as follows: Extruder temperature Zone-1=197° C.; Zones-2 and -3 were 207° C. The screw speed was 55 rpm. The film was extruded onto a chill roll maintained at 38° C. where it was drawn down to 3 mil in thickness and wound into a roll at a speed of 30 feet (9.14 meters) per second.

The films were tested for oxygen permeability on a MOCON Ox-Tran 1000 unit, manufactured by Modern Controls, of Minneapolis, Minn. The films were mounted in the diffusion cells where they were first purged with nitrogen as a first step in establishing a base line. This was followed by exposing the upper surface of the film to an oxygen rich atmosphere and the lower surface to the carrier gas (1% $H_2$ in $N_2$). The transmission of oxygen at steady state was monitored and detected by a nickel cadmium fuel cell known as a Coulox Detector. The Ox-Tran 1000 unit was equipped to record the steady state flux in units of cc. mil/100 $in^2$. Atm. Day. Measurements were made at 23° C., and 80% relative humidity. The ASTM test D-3985 for oxygen permeability was used.

The impact values were tested according to ASTM D256-84 Izod Impact Test. The Tensile Yield Strength, Elongation at Break and Tensile Modulus were tested according to ASTM D638-84. The drop weight impact was measured according to the procedure of ASTM D2444 with the Dynatup impact apparatus. The deformation temperature under load (DTUFL) was measured at a load of 1.8 mPa in degrees centigrade using ASTM D 648-72 with 0.25 inch (6.35 mm.) thick test specimens.

TABLE VIII

Physical Properties of Thermoplastic Polyurethane Elastomers.

| COMPARATIVE EXAMPLES: | 36 | 37 | 38 |
|---|---|---|---|
| PELLETHANE 2363-55D %(w/w) | 100 | | |
| ESTANE 58134 %(w/w) | | 100 | |
| ESTANE 58309-021 %(w/w) | | | 100 |
| PHYSICAL PROPERTY | | | |
| TENSILE-YIELD, mPa | 3.9 | 1.9 | 1.8 |
| ELONGATION @ BREAK % | >231.0 | >260.0 | >260.0 |
| TENSILE-MODULUS, gPa | 0.10 | 0.03 | 0.04 |
| $O_2$ PERMEABILITY 80% R.H cc. mil/(100 $in^2$. Day. Atm.) | 96.40 | 246.60 | 222.80 |

TABLE IX

Physical Properties of Blends of Thermoplastic Polyurethane Elastomers with Melt Processable PVOH(AIRVOL ®-205)-Acrylic Terpolymer.

| EXAMPLES: | 39 | 40 | 41 |
|---|---|---|---|
| PELLETHANE 2363-55D %(w/w) | 80 | | |
| ESTANE 58134 %(w/w) | | 80 | |
| ESTANE 58309-021 %(w/w) | | | 80 |
| PVOH-1 %(w/w) | 20 | 20 | 20 |
| PHYSICAL PROPERTY | | | |
| TENSILE-YIELD, mPa | 5.5 | 2.1 | 2.8 |
| ELONGATION @ BREAK % | 228.0 | >260.0 | >260.0 |
| TENSILE-MODULUS, gPa | 0.21 | 0.08 | 0.08 |
| $O_2$ PERMEABILITY 80% R.H cc.mil/(100 $in^2$. Day. Atm.) | 90.90 | 191.24 | 183.68 |

TABLE X

Physical Properties of Blends of Thermoplastic Polyurethane Elastomers with Melt Processable PVOH(AIRVOL ®-107)-Acrylic Terpolymer

| EXAMPLES: | 42 | 43 | 44 |
|---|---|---|---|
| PELLETHANE 2363-55D %(w/w) | 80 | | |
| ESTANE 58134 %(w/w) | | 80 | |
| ESTANE 58309-021 %(w/w) | | | 80 |
| PVOH-2 %(w/w) | 20 | 20 | 20 |
| PHYSICAL PROPERTY | | | |
| TENSILE-YIELD, mPa | 6.7 | 3.3 | 2.9 |
| ELONGATION @ BREAK % | 216.0 | >260.0 | >260.0 |
| TENSILE-MODULUS, gPa | 0.22 | 0.07 | 0.06 |
| $O_2$ PERMEABILITY 80% R.H cc. mil/(100 $in^2$. Day. Atm.) | 119.60 | 174.07 | 195.44 |

EXAMPLES 45–49

These examples describe modification of polyester and polycarbonate with the composites from a poly(vinyl alcohol) and a (meth)acrylic ester/copolymerizable cyclic amide/copolymerizable acid terpolymer.

COMPARATIVE EXAMPLES 45–46

Samples of PET and PC were dried in a forced air oven at 100° C., and then either extruded into thin (3–5 mils) films or pellets. The pellets were injection molded on an Arburg injection molding machine. The thin films were extruded at the following processing conditions:

| EXTRUDER BARREL TEMPERATURE: | ZONE-1 = 238° C. |
| | ZONE-2 = 253° C. |
| | ZONE-3 = 254° C. |
| DIE TEMPERATURE: | DIE-1 = 254° C. |
| RATE: | RPM = 55° C. |
| ROLL TEMPERATURE: | 38° C. |

The injection molding conditions for both PET and PC were as follows: Nozzle temperature: 251° C.; Zones 1, 2 and 3: 238, 279 and 271° C. respectively: Injection pressure=3.4 mPa; Back pressure=1.8 mPa; mold temperature=271° C. The mechanical properties data are listed in TABLE XI.

The blends described in TABLE XII were prepared by melt compounding and extruding mixtures of the melt processable PVOH composites described in EXAMPLES 18–35 with PET and PC. The blends were extruded and injection molded into thin films and ASTM parts respectively at the conditions specified in EXAMPLES 45–46. The gas permeability and mechanical properties are listed in TABLE XII.

An examination of the data shows an increase in modulus and elongation at break and DTUFL. However, the notched and drop weight impact decreased with the inclusion of both PVOH-1 and PVOH-2 into PET and PC.

TABLE XI

Physical Properties of PET and PC(CD 2000).

| POLYMERS<br>COMPARATIVE EXAMPLES | PET<br>45 | PC(CD 2000)<br>46 |
|---|---|---|
| PET %(w/w) | 100 | |
| PC(CD 2000) %(w/w) | | 100 |
| PHYSICAL PROPERTY | | |
| TENSILE-YIELD, mPa | 57.99 | 59.30 |
| TENSILE-MODULUS, gPa | 2.28 | 2.22 |
| ELONGATION @ BREAK % | 235.00 | 89.70 |
| DYNATUP IMPACT STRENGTH (J) | 66.20 | 73.34 |
| NOTCHED IZOD @ 23° C. (J/m) | 25.63 | 574.58 |
| DTUFL (264 psi, 2° C./min.)(unannealed) ° C. | 65.20 | 132.45 |
| DTUFL (264 psi, 2° C./min.) (ann. 4 hrs. @ 80° C.), ° C. | 66.15 | 131.30 |

TABLE XII

Physical Properties of Blends of PET and PC(CD 2000) with Melt Processable PVOH-1 and PVOH-2 Composite.

| EXAMPLES: | 47 | 48 | 49 |
|---|---|---|---|
| PET %(w/w) | 80 | | 80 |
| PC(CD 2000) %(w/w) | | 80 | |
| PVOH-1 %(w/w) | 20 | 20 | |
| PVOH-2 %(w/w) | | | 20 |
| PHYSICAL PROPERTY | | | |
| TENSILE-YIELD, mPa | 60.40 | — | 60.79 |
| TENSILE-MODULUS, gPa | 2.63 | 2.65 | 2.74 |
| ELONGATION @ BREAK % | 213.00 | 1.19 | >247.00 |
| DYNATUP IMPACT STRENGTH (J) | 3.11 | 1.37 | 5.40 |
| NOTCHED IZOD @ 23° C. (J/m) | 14.42 | 10.15 | 19.76 |
| DTUFL (264 psi, 2° C./min.) (unannealed) ° C. | 61.40 | 115.25 | 71.45 |
| DTUFL (264 psi, 2° C./min.) (ann. 4 hrs. @ 80° C.), ° C. | 65.70 | 113.50 | 71.80 |

EXAMPLES 50–51

This example illustrates the physical properties of a ternary blend containing corn starch versus that of a binary "composite" containing an acrylic copolymer with amide and acid functionality and a poly(vinyl alcohol).

In the mixing bowl of a high-intensity mixer are placed 75 parts poly(vinyl alcohol) (88% hydrolyzed, from Example 1 above), corn starch (10 parts), and 5 parts of the acrylic terpolymer (MMA/ N-vinylpyrrolidone/ methacrylic acid= 73/25/02. A small amount (0.5%) of a hindered phenol antioxidant is also present. The granules are heated to a constant temperature of 45° C. at an agitation rate of 800–900 rpm for 10 minutes. The free-flowing powder is collected in polyethylene bags. A control is prepared of 85 parts PVOH and 15 parts of the acrylic terpolymer (absent the corn starch).

The above mixtures are fed to a single-screw Killion extruder where they are melt-compounded and extruded into pellets at a screw speed of 80 rpm and zone and die temperatures of 193° C., except for zone 1 of the extruder, which is at 180° C. The pellets are dried in a forced hot air oven and then are molded on an Arburg injection molding machine equipped with an ASTM family mold, with nozzle and zone temperatures of 200° C., an injection pressure of 6.2 mPa and a back pressure of 1.4 mPa.

| | Example 50 | Example 51 |
|---|---|---|
| Tensile Strength, mPa | 79.3 | NA |
| Elongation at break, % | 81 | NA |
| Tensile Modulus, gPa | 4.46 | 4.44 |
| Notched Izod, J/m | 21.4 | 10.7 |
| DTUFL, ° C. | 62 | 66 |

NA = not available

It can be seen that the ternary blend has improved notched impact properties at the expense of a slight decrease in heat-distortion temperature.

EXAMPLE 52.

In a manner similar to Example 50, a blend of 65 parts of the poly(vinyl alcohol), 20 parts of corn starch, 10 parts of the acrylic tetrapolymer (MMA/ N-vinylpyrrolidone/ethyl acrylate/methacrylic acid=55/25/18/02, and 5 parts glycerol were blended, extruded, and molded.

We claim:

1. A polymeric blend comprising:
   (a) from about 10 to about 95 parts of at least one natural and melt-intractable polar polymer selected from starch, chitin, chitosan, lignin or cellulose;
   (b) from about 5 to about 90 parts of a polymeric composite of:
      i.) from about 40 to about 95 parts by weight of a first polymer containing at least 50 mol % of units of the structure

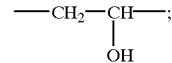

ii) from about 5 to about 60 parts by weight of a second polymer containing at least about 70 parts of units derived from a lower alkyl methacrylate or acrylate, and at least one of either up to about 25 parts of units derived from a vinyl or vinylidene monomer containing an amide group or up to about 25 parts of units derived from an unsaturated carboxylic acid or anhydride.

2. The blend of claim 1 wherein components (a), (b)(i), and (b)(ii) are combined essentially simultaneously.

* * * * *